Jan. 6, 1942.  C. L. CONNERS  2,268,698
WEIGHING SCALE
Filed March 28, 1940
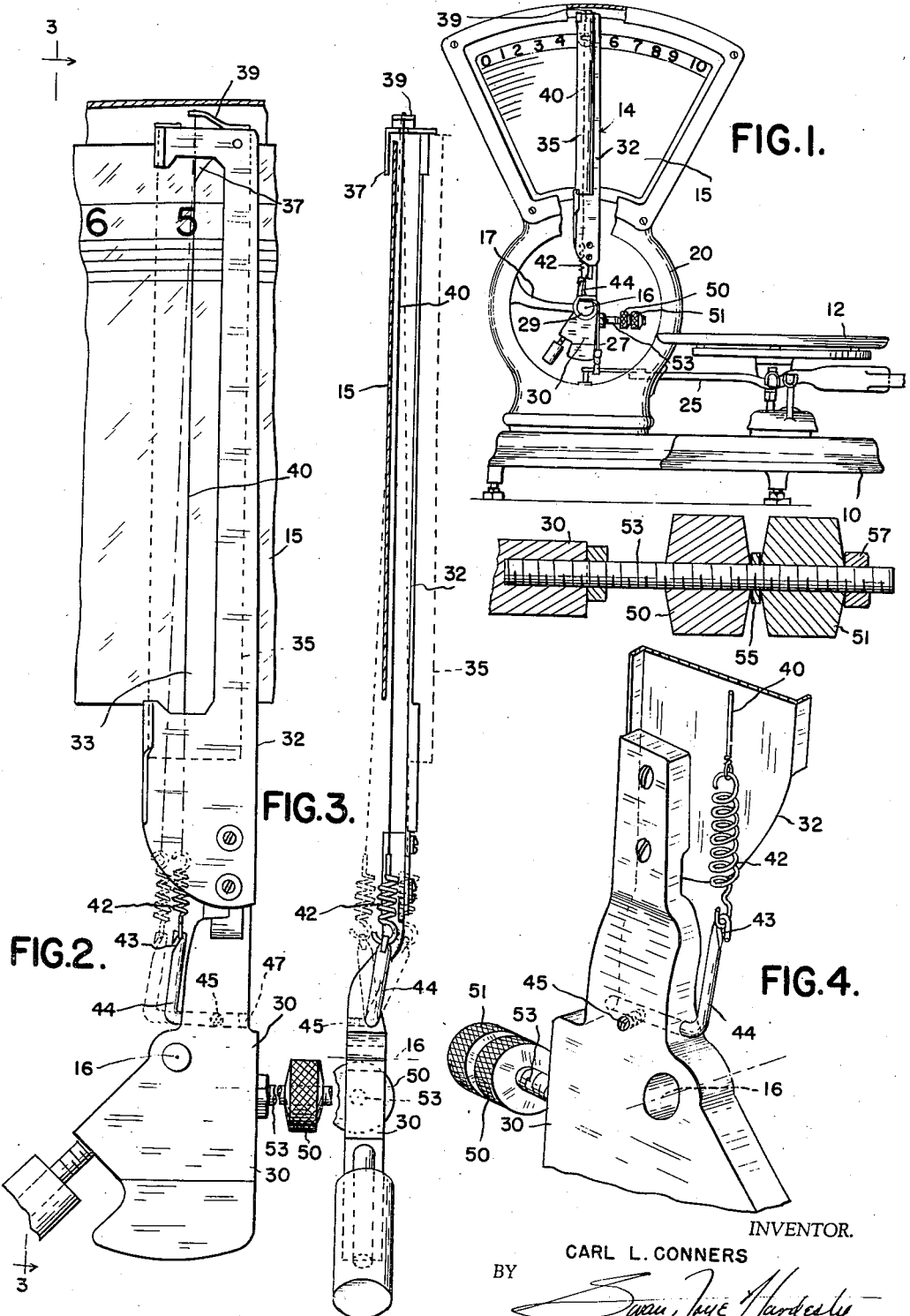
INVENTOR.
CARL L. CONNERS
BY
ATTORNEYS Patented Jan. 6, 1942

2,268,698

UNITED STATES PATENT OFFICE 2,268,698

WEIGHING SCALE

Carl L. Conners, Louisville, Ky., assignor to Walter F. Stimpson, Louisville, Ky.

Application March 28, 1940, Serial No. 326,439

5 Claims. (Cl. 116—129)

This invention relates to weighing scales, and particularly to the weight indicating means thereof, having as its principal object the provision of an improved indicating hand construction for computing scales of the fan type.

Scales of the type in question are provided with a sector-shaped chart having radially disposed indicia, which must be aligned with the pivot axis of a hand, arranged to sweep over the chart. The hand in turn is provided with an indicator thread or wire forming a "hair-line," which also must be truly radial with respect to the pivot axis. The present invention has as an important object to improve the mounting means for the indicator wire or thread of such a hand construction.

A further object is to provide such an improved mounting means for the indicator wire or thread which permits ready adjustment thereof in two planes, one enabling alignment of the same radially with respect to the axis, and the other permitting the same to be adjusted toward and from the chart, to promote accuracy of reading by allowing the hair line wire always to be located as close to the chart as possible.

Particularly where the hand is provided with a magnifying lens to increase the accuracy with which the scale may be read, in the manner disclosed in my copending application Serial No. 233,645, filed October 6, 1938, it is important that the indicator thread be arranged as close to the chart as possible. With this in mind, a related object of the present invention is to provide a single adjustable supporting means permitting both adjustments and which permits either adjustment to be made independently of the other, movement of the thread toward and from the chart being incapable of changing the alignment of the same with respect to the axis of the hand.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a front elevational view of a weighing scale provided with indicating means constructed in accordance with the present invention, parts being broken away to afford a better view of the mounting of the indicator hand.

Figure 2 is an enlarged elevational view of the indicator hand, the magnifying lens being removed and the counterweighting means being partly broken away, also fragmentarily showing the chart.

Figure 3 is a vertical sectional view of the hand and chart, taken substantially on the line 3—3 of Figure 2 and looking in the direction of the arrows; and Figure 4 is a fragmentary perspective view on a larger scale, showing the lower portion of the hand assembly and the adjustable supporting means for the lower end of the indicator wire.

Referring now to the drawing: reference character 10 designates generally the base of a weighing scale, which is illustrated as of a conventional type, having a load receiving platform, 12, located near one end thereof, and a weight indicating assembly arranged within a housing 20 upstanding at the end thereof. Within housing 20 are a chart 15 and an indicator hand assembly, generally designated 14.

The hand assembly is swingable about a fixed pivot, the axis of which is designated 16, supported by an arm 17 projecting inwardly from one side of the housing 20. The hand assembly is actuated through the agency of a main lever 25, upon which the platform is supported, and a strap 27 connected to the nose of the lever and wrapped about an eccentric 29, secured to the hand assembly to turn the same.

The hand assembly consists of a relatively heavy combined frame and counterweight portion 30, which may be of cast metal, and which projects both above and below the pivot axis. To the upwardly projecting portion thereof the sheet metal extension 32, which sweeps over the chart and forms the hand proper is secured. The sheet metal hand portion is cut out along one side throughout the greater part of its length, as indicated at 33, and into the opening thus formed is fitted and secured the elongated lens 35, which serves to magnify the figures inscribed upon the subjacent chart 15.

At its upper extremity the hand is bent rearwardly, to extend over the top of the chart, and then downwardly, the down bent portion 37 being pointed and adapted to serve as a pointer to provide weight indication upon the rear or customer side of the scale. To the top of the overbent hand portion is secured a resilient sheet metal bracket 39, to which the wire 40 is attached.

At the lower extremity the indicator wire is attached to a spring 42, stressed to keep the wire straight and which is in turn hooked in a slot 43 in the upper end of an adjustable supporting bracket 44. Bracket 44 is formed of a metal rod, of circular cross section, bent to substantially L- shape. The lower leg of the bracket is disposed transversely and extends into an opening, 47, in the portion 30. The opening is formed accurately as to its direction, extending perpendicularly to a line drawn between the axis 16 and the upper supporting point for the indicator wire. Opening 47 is also of such size as to permit sliding and rotation of the bracket rod 44 therein. A set screw 45 enables the bracket to be locked against such movement. The slot 43 in the bracket, in which spring 42 is hooked, permits the lower looped end of the spring to turn therein when the bracket arm is swung, thereby allowing the spring and wire assembly to remain straight, regardless of the inclination of the bracket arm.

It will be seen that both during initial adjustment of the scale by the manufacturer, and in subsequent servicing operations, alignment of the wire with respect to the axis 16, and accordingly with respect to the chart indications, can readily be effected, simply by moving the bracket inwardly or outwardly of the opening 47. Figure 2 shows, in solid and dotted lines, different positions of adjustment which may thus be effected.

In order to move the wire closer to or farther from the chart, it is merely necessary to swing the bracket arm 44 in a transverse direction, as indicated in dotted lines in Figure 3, and thereafter tighten the set screw to hold the same in any adjusted position.

In view of the fact that the axis of rotation about which the bracket swings during the last mentioned adjustment is perpendicular to a line drawn between the axis 16 and the upper extremity of the wire, such adjustment of the wire toward and from the chart does not disturb the radial adjustment. The effect of this disposition of the opening 47 is to force the wire, when the bracket is swung, to move in a plane containing the axis of the hand and the point of attachment of the outer end of the wire thereto. The two adjustments may thus be made independently, despite the use of but a single movable bracket for this purpose.

In order to counterbalance the extra weight incorporated in the hand assembly by reason of the use of the lens 35, adjustable counterweighting means is provided in the form of enlarged nuts, 50, 50, threaded upon a stud 53 which is secured in and projects laterally from the main counterweight portion 30. As shown in Figure 3, the axis of the stud is located somewhat to the rear of the plane of the hand assembly. This offsets the forward projection of the lens 35, balancing the hand with respect to a transverse axis lying in the plane in which it moves, as well as with respect to its axis of pivotal movement. Between the threaded nuts 50, 51 is a spring lock washer 55, and a jam nut 57 may also be provided to lock the weights in adjusted position.

Inasmuch as it is impossible, in quantity production manufacture of such scales, to provide lenses of absolutely uniform weight, and equally impossible always to position the lenses in identical relation to the axis of the hand, the adjustability of the weights along the supporting stud 53 permits accurate sealing of the scale regardless of such differences, and, further, permits simple readjustment in event breakage of a lens, or a servicing operation of some other character, disturbs the balance of the hand assembly. Adjustment of the weights 50, 51 will also be seen to provide a convenient means for counteracting the effects of movement of the adjustable support 44 for the indicator wire.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a weighing scale construction, in combination with a chart, a hand construction pivoted upon a fixed axis and swingable over the chart, and incorporating a body, an elongated indicator extending longitudinally of the hand construction and one end of which is fixed with relation to said body, and means for adjustably securing the other end of the indicator to said body for movement with relation thereto both transversely of and toward and from the hand, comprising a bracket rod bent to a substantially right angle and having one arm rotatably and slidably mounted in said body and another arm projecting in the general direction of said indicator, the indicator being attached to the last-mentioned arm, and common means for holding the first-mentioned arm against rotary and sliding movement, to thereby position the bracket rod and the indicator attached thereto.

2. In a weighing scale, weight indicating means comprising in combination with a chart, a hand construction swingable over the chart in cooperative relation therewith and comprising a longitudinally elongated body, a filamentary indicator carried by and extending longitudinally of said body, and means for adjustably securing at least one end of said indicator to said body, comprising an angular bracket member having one arm carried by and movable longitudinally of said body and a second arm secured to and movable longitudinally with the first and also swingable in a plane transverse with relation to such longitudinal movement, and means for locking said first-mentioned arm and thereby securing the second arm and the indicator attached thereto against movement.

3. In a weighing scale construction, in combination with a chart, a hand construction pivoted upon a fixed axis and swingable over the chart, and incorporating a body portion, an indicator portion extending longitudinally of the hand construction, and means for adjustably securing one end of the indicator portion with respect to said hand construction, comprising a bracket member having rigidly connected angularly disposed arms, one serving to support the other and being pivoted and bodily slidable in said hand construction, the indicator being secured to said other arm at a point spaced from the pivotal axis of the first-mentioned arm, and means for holding said first-mentioned arm and thereby the bracket and indicator member against pivotal and swinging movement.

4. Means as set forth in claim 3 in which said arm is pivoted upon an axis lying substantially parallel to the plane of the hand and swingable in a plane transverse thereto.

5. Means as set forth in claim 3 in which said body comprises a metallic mass also serving as a counterweight, the first-mentioned arm being pivoted and slidable in an aperture in said body, and screw-threaded setting means reacting against said body for releasably locking said arm and thereby the bracket against unwanted movement.

CARL L. CONNERS.